(12) United States Patent
Kawabata

(10) Patent No.: US 7,504,570 B2
(45) Date of Patent: Mar. 17, 2009

(54) METHOD OF MANUFACTURING CARBON NANOTUBES

(75) Inventor: Akio Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 11/155,494

(22) Filed: Jun. 20, 2005

(65) Prior Publication Data

US 2007/0003471 A1      Jan. 4, 2007

Related U.S. Application Data

(63) Continuation of application No. PCT/JP03/04123, filed on Mar. 31, 2003.

(51) Int. Cl.
*D01F 9/127* (2006.01)
(52) U.S. Cl. .................. 977/843; 423/447.3; 977/845
(58) Field of Classification Search ............ 423/447.3, 423/447.1; 977/843, 847, 845
See application file for complete search history.

(56) References Cited

U.S. PATENT DOCUMENTS

| 2002/0102193 | A1* | 8/2002 | Smalley et al. ............ 422/190 |
| 2003/0124717 | A1* | 7/2003 | Awano et al. ............ 435/287.2 |
| 2003/0129119 | A1* | 7/2003 | Chiu et al. ............ 423/445 R |

FOREIGN PATENT DOCUMENTS

| EP | 0 758 028 A2 | 2/1997 |
| JP | 8-231210 | 9/1996 |
| JP | 09031757 A | 2/1997 |
| JP | 09-228160 | * 9/1997 |
| JP | 09228160 A | 9/1997 |
| JP | 2000-86218 | 3/2000 |
| JP | 2000-290008 | 10/2000 |
| JP | 2003-146635 | 5/2003 |
| WO | WO 98/39250 | 9/1998 |

OTHER PUBLICATIONS

M. Yudasaka, et al, "Nitrogen-Containing Carbon Nanotube Growth From Ni Phthalocyanine by Chemical Vapor Deposition" Carbon, vol. 35, No. 2, 1997, pp. 195-201.*

S. Maruyama et al.; "Low—temperature synthesis of high-purity single-walled carbon nanotubes from alcohol", Chemical Physics Letters, vol. 360, Jul. 10, 2002, pp. 229-234. (Cited in the int'l. search report and in the specification).

L. P. Biro et al.; "Growth of carbon nanotubes by fullerene decomposition in the presence of transition metals", Chemical Physics Letters, vol. 306, Jun. 1, 1999, pp. 155-162, (Cited in the int'l. search report).

T. W. Ebbesen et al.; "Large-scale synthesis of carbon nanotubes", Nature, vol. 356, Jul. 16, 1992, pp. 220-222. (Cited in the specification).

* cited by examiner

*Primary Examiner*—Wayne Langel
*Assistant Examiner*—Brittany M Martinez
(74) *Attorney, Agent, or Firm*—Westerman, Hattori, Daniels & Adrian, LLP.

(57) ABSTRACT

A method of manufacturing carbon nanotubes that is capable of growing carbon nanotubes on a substrate by a CVD method without giving rise to residual carbon impurities is provided. The method of manufacturing carbon nanotubes according to the present invention is a method in which carbon nanotubes are grown on a substrate by a chemical vapor deposition (CVD) process using a reaction gas containing a compound for the carbon source, wherein a compound having a carbon skeleton and a functional group which is effective for removing carbon impurities that deposit during the growth of carbon nanotubes is used as the compound for the carbon source.

5 Claims, 2 Drawing Sheets

METHOD OF MANUFACTURING CARBON NANOTUBES

CROSS-REFERENCE TO RELATED APPLICATION

This application is a continuation application and is based upon PCT/JP03/04123, filed on Mar. 31, 2003.

TECHNICAL FIELD

The present invention relates to a method of manufacturing carbon nanotubes. More particularly, the present invention relates to a method of manufacturing carbon nanotubes that is capable of growing carbon nanotubes on a substrate using a CVD method without giving rise to residual carbon impurities.

BACKGROUND ART

Various methods have been known for manufacturing carbon nanotubes, such as arc dischrge methods, laser ablation methods, thermal CVD methods, plasma CVD methods, and the like. Carbon nanotubes produced by arc discharge methods or laser ablation methods include both single wall carbon nanotube (SWNT: Single Wall Nanotube), which consists of a single graphene sheet, and multiple-wall carbon nanotube (MWNT: Multi-Wall Nanotube), which consists of a plurality of graphene sheets. In general, MWNTs are produced by thermal CVD methods and plasma CVD methods. In a SWNT, a graphene sheet, in which carbon atoms are bound to each other via a strong bond called an sp2 bond so as to form six-membered rings, is rolled into a tube with the end of the tube being closed by several six-membered rings together with five-membered rings.

A method for synthesizing carbon nanotubes in large amounts was proposed in Nature 358, 220 (1992). The product obtained by the method described in this literature contains, in addition to carbon nanotubes, a large amount of residual carbon impurities such as graphite-like material and amorphous carbon and, therefore, the carbon nanotubes have to be separated and purified. However, as carbon impurities have strong tendency to coagulate, it has been very difficult to isolate them completely.

Methods of purifying carbon nanotubes are disclosed in JP 8-231210 A, JP 2000-290008 A, JP 2002-515847, etc. All of these methods are post-processing methods to be performed after carbon nanotubes have been manufactured, and are not applicable to carbon nanotubes manufactured directly on a substrate.

Use of an alcohol such as ethanol or methanol as the carbon source for growing carbon nanotubes is described in S. Maruyama et al., Low-Temperature synthesis of high-purity single-walled carbon nanotubes from alcohol, Chem. Physics Letters 360 (2002), 229-234. It is stated that OH radicals produced upon decomposition of alcohol serve to effectively remove amorphous carbon, and thereby makes it possible to grow carbon nanotubes of high purity.

JP 2000-86218 A discloses a method of manufacturing carbon nanoubes by thermal cracking of aromatic hydrocarbons such as benzene or toluene, or aliphatic hydrocarbons such as naphtha or gas oil in the presence of a thermal cracking accelerator such as cyanuric acid.

Patent Document 1
JP 8-231210 A
Patent Document 2
JP 2000-290008 A
Patent Document 3
JP 2002-515847
Patent Document 4
JP 2000-86218 A
Non-Patent Document 1
Nature 358, 220 (1992)
Non-Patent Document 2
S. Maruyama et al., Low-Temperature synthesis of high-purity single-walled carbon nanotubes from alcohol, Chemical Physics Letters 360 (2002) 229-234

DISCLOSURE OF THE INVENTION

It is an object of the present invention to provide a method of manufacturing carbon nanotubes that is capable of growing carbon nanotubes, on a substrate using a CVD method, without giving rise to residual carbon impurities.

A method of manufacturing carbon nanotubes of the present invention is a method of manufacturing carbon nanotubes in which carbon nanotubes are grown on a substrate by a chemical vapor deposition (CVD) method using a reaction gas containing compounds for the carbon source, wherein, as the compound for the carbon source, a compound having a carbon skeleton as well as a functional group that is effective in removing carbon impurities which deposit during the growth of the carbon nanotubes, is used.

Preferably, the compound for the carbon source is a fullerene having said functional group.

A preferred functional group which the fullerene may have is a hydrogen atom, an OH, $NO_2$, $NO_3$, $SO_3$, $SO_4$, $NH_2$, $NH_3$ or $NH_4$ group, or a halogen atom.

The compound for the carbon source may be a hydrocarbon. The hydrocarbon may be an aliphatic hydrocarbon such as methane, acetylene, ethane, propane or butane, or a cyclic hydrocarbon having an aromatic ring (six member ring) such as benzene.

When the compound for the carbon source is an aliphatic hydrocarbon, a preferred functional group that the hydrocarbon may have is an $NO_2$, $NO_3$, $SO_3$, $SO_4$, $NH_2$, $NH_3$ or $NH_4$ group, or a halogen atom. When the compound for the carbon source is a cyclic hydrocarbon, in addition to these groups, a hydrogen atom is also an effective functional group for removing carbon impurities.

A mixture of two or more compounds for a carbon source having the aforementioned functional group may be used in the present invention.

BEST MODE FOR CARRYING OUT THE INVENTION

Figure 1A:
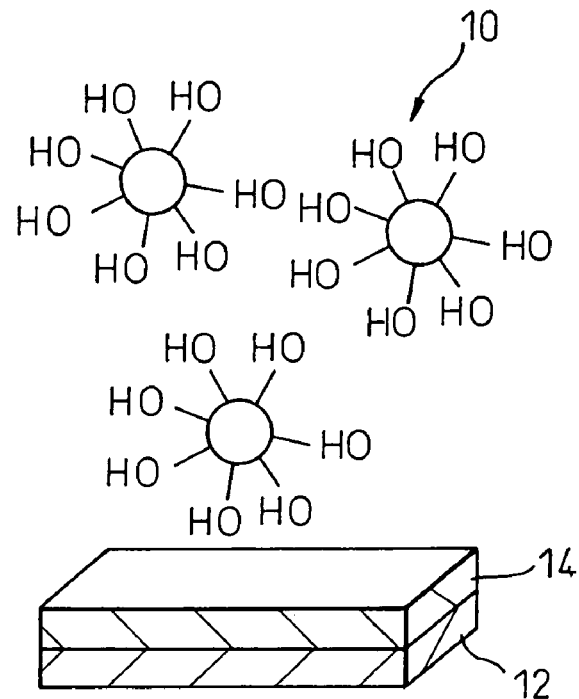
FIGS. 1A and 1B are illustrations showing the first half of the process of manufacturing carbon nanotubes explained in example 1 according to the present invention.

A method of manufacturing carbon nanotubes according to the present invention is a method of manufacturing carbon nanotubes in which carbon nanotubes are grown on a substrate by a chemical vapor deposition (CVD) method using a reaction gas containing a compound for the carbon source. The invention is characterized in that, as the compound for the carbon source, a compound having a carbon skeleton as well as a functional group that is effective for removing carbon impurities which deposit during the growth of carbon nanotubes, is used.

Representative examples of the compound having a carbon skeleton in the invention include fullerene, which is a carbon structure having both five-membered carbon rings and six-membered carbon rings, or a compound basically composed of at least one carbon atom and hydrogen atoms bound to it, which is an aliphatic hydrocarbon or a cyclic hydrocarbon having linear or ring structure of successive carbon atoms when carbon number is two or more. When fullerene is used, carbon nanotubes can be grown in accordance with the diameter and carbon arrangement of the fullerene. A cyclic hydrocarbon, especially benzene or the like having the same ring structure as the six-membered ring constituting the graphene sheet of carbon nanotubes, can be advantageously used to grow carbon nanotubes. In the invention, an aliphatic hydrocarbon compound such as methane, acetylene, ethane, propane, butane, can also be used as the carbon source, as usual. A mixture of a plurality of carbon source compounds can also be used.

The compound for the carbon source used in the present invention must have at least one functional group that is effective for removing the carbon impurities, such as graphite-like materials, amorphous carbon, which deposit during the growth of the carbon nanotubes. When the compound for the carbon source is fullerene basically composed only of carbon atoms, a useful functional group is a hydrogen atom, an OH, $NO_2$, $NO_3$, $SO_3$, $SO_4$, $NH_2$, $NH_3$ or $NH_4$ group, or a halogen atom. When a hydrocarbon generally comprising hydrogen atoms in addition to structural carbon atoms is used as the compound for the carbon source, the functional group may be an $NO_2$, $NO_3$, $SO_3$, $SO_4$, $NH_2$, $NH_3$ or $NH_4$ group, or a halogen atom. When the hydrocarbon is a cyclic compound, the hydrogen atom can be regarded as a functional group.

The carbon impurities which deposit during the growth of the carbon nanotubes in a CVD method have higher reactivity than the carbon nanotubes, so that they react with the functional group contained in the compound for the carbon source under the conditions of the growth of carbon nanotubes to thereby produce compounds having a high vapor pressure. The carbon impurities will be removed by vaporization of these reaction products. Thus, growth of carbon nanotubes can be achieved by a CVD method while removing the carbon impurities at the same time.

Fullerene containing a functional group, in other words, fullerene chemically modified with a functional group, can be easily obtained commercially. Hydrocarbons containing functional groups can also easily be obtained commercially, or can be synthesized.

Although a carbon compound having a functional group is used as the carbon source in the present invention, the growth mechanism itself of carbon nanotubes by a CVD process is thought to be basically the same as the growth mechanism of carbon nanotubes using an ordinary carbon source having no functional group. Thus, carbon atoms supplied from the carbon source compound are grown by the effect of the metal catalyst disposed on the substrate into a tube formed of a graphene sheet of six-membered rings. On this occasion, carbon impurities such as amorphous carbon, which tend to deposit on the substrate and the like, are removed by gasification due to the effect of the functional group as described above, so that clean carbon nanotubes can be obtained.

A more preferred compound for the carbon source in the present invention is a fullerene. Fullerenes have various diameters depending upon the number of carbon atoms composing the fullerenes molecules, such as 60, 84, 240. Thus, the diameter of the grown carbon nanotubes can be conveniently controlled in accordance with the diameter of the fullerene molecules. For example, the diameter of a fullerene with carbon number of 60 is about 0.7 nm, and a carbon nanotube of this diameter can be grown using this fullerene as a nucleus.

Further, a fullerene is a carbon structure comprising both five-membered ring carbon structure and six-membered ring carbon structure, with the five-membered ring structure being less stable, from an energy viewpoint, than the six-membered ring. Therefore, a semi-spherical nucleus is formed on a metal catalyst layer when the five-membered ring carbon structures are broken and the bottom of a fullerene is composed solely of six-membered ring structures under the growth reation conditions of carbon nanotubes. When a carbon nanotube is formed based on such a nucleus, a carbon nanotube with arm-chair-type chirality is obtained. In this way, the use of a fullerence makes it easy to control the chirality of grown carbon nanotubes.

In addition, fullerene is a solid at ordinary temperatures and can be easily sublimated to a gas at an elevated temperature. Thus, fullerene is easier to handle as compared to methane or acetylene, which are gases at ordinary temperature, or to methanol or ethanol, which are liquids at ordinary temperature.

Regardless of the type of compound used for the carbon source, a metal catalyst is used in the manufacture of carbon nanotubes using a CVD method. A transition metal such as Fe, Co, Ni, or Pd, or an alloy of two or more of them is used as the metal catalyst. The metal catalyst may be disposed as a continuous layer on the growth substrate before the carbon nanotubes are grown. Alternatively, it may be disposed as a multiplicity of fine particles.

It is also possible for the transition metal to be included into the molecule of the compound for the carbon source with a functional group. In this case, the metal catalyst need not necessarily be disposed on the growth substrate. As an example of a compound for the carbon source having both a metal catalyst and a functional group, a complex such as ferrocene modified with a functional group can be mentioned. It is also possible to use a fullerene chemically modified with such a complex or a fullerene chemically modified with a functional group and a transition metal.

The substrate on which carbon nanotubes are to be grown according to the present invention may be a substrate of semiconductor material such as silicon or gallium arsenide (GaAs) or a substrate of an inorganic material such as quartz or alumina.

The CVD method employed in the method of manufacturing carbon nanotubes of the present invention may be a thermal CVD method or a plasma CVD method.

Next, the present invention will be further described with reference to examples. It is not intended to limit the present invention to these examples.

EXAMPLE 1

Figure 1B:
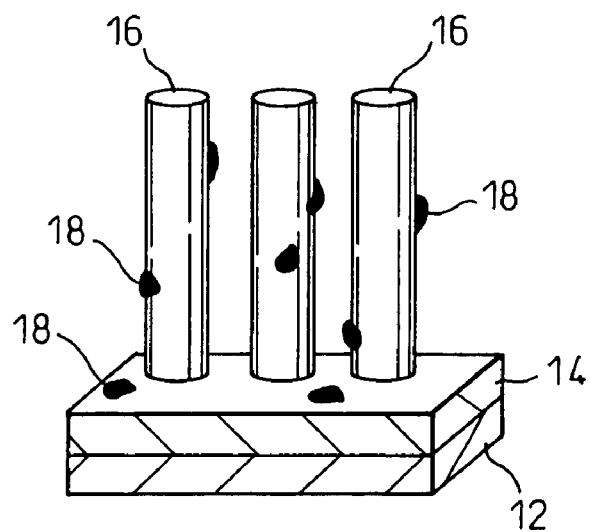
Figure 2A:
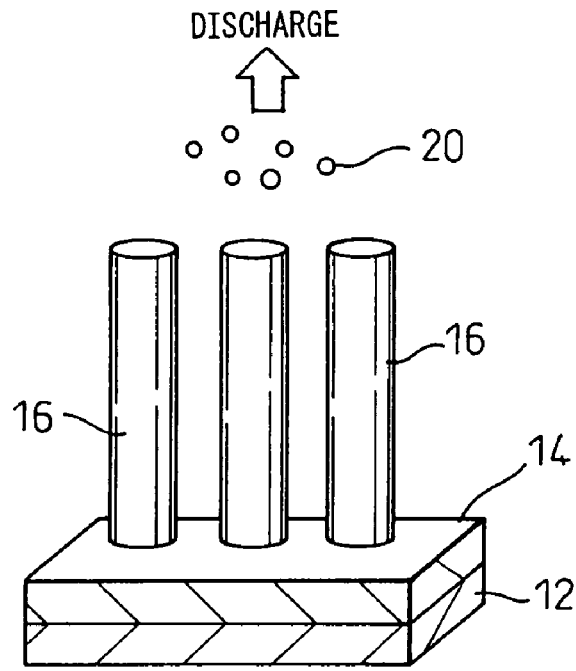
FIGS. 2A and 2B are illustrations showing the second half of the process of manufacturing carbon nanotubes explained in example 1 according to the present invention.
Figure 2B:
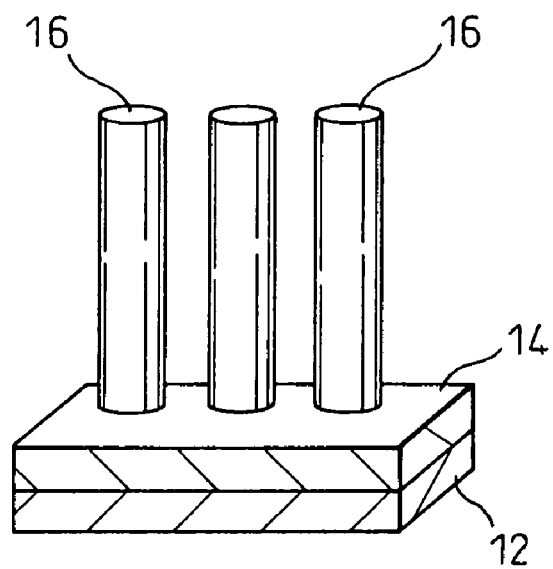

C60 fullerene chemically modified with OH groups (C60 $(OH)_{12}$) is used as a compound for the carbon source having functional groups. $C60(OH)_{12}$ is sublimated (or it may be dispersed in a solvent and then be vaporized by boiling the solution). As shown in FIG. 1A, sublimated $C60(OH)_{12}$ fullerene 10 is introduced into a thermal CVD chamber (not shown) in which a silicon substrate 12 having a catalyst layer 14 formed on the surface thereof by evaporation of Ni is disposed. By heating the interior of the chamber to 600° C. at 1 kPa, C60 $(OH)_{12}$ is reacted with Ni catalyst to produce nickel carbide. Then, more $C60(OH)_{12}$ is supplied to thereby grow carbon nanotubes 16 as shown in FIG. 1B (for the sake of simplicity, C60(OH)$_{12}$ fullerene is not shown in FIG. 1B). The carbon impurities 18 such as amorphous carbon which deposit during this process have higher reactivity as compared to the nanotubes 16, so that they react with OH group chemically modifying C60(OH)$_{12}$ to produce volatile compounds 20 (FIG. 2A), which are discharged together with unreacted C60(OH)$_{12}$ out of the chamber. In this manner, carbon nanotubes 16 of high quality, and which are not contaminated with impurities, can be obtained (FIG. 2B).

EXAMPLE 2

Iron porphyrin containing an Fe atom in the center of a porphine ring comprising benzene rings is used to grow carbon nanotubes by a thermal CVD method. The iron porphyrin is introduced into a chamber in which a silicon substrate (a silicon substrate having an oxide film naturally formed on its surface may be used) has been placed, and the interior of the chamber is heated to 500° C. at 1 kPa to thereby decompose the iron porphyrin and to grow carbon nanotubes on the substrate using Fe as a catalyst. The carbon impurities which deposit during this process are removed by the effect of hydrogen contained in the iron porphyrin, and clean carbon nanotubes are obtained.

EXAMPLE 3

Benzene sulfonic acid monohydrate, $C_6H_5SO_3H \cdot H_2O$, is used to grow carbon nanotubes by a thermal CVD method. Benzene sulfonic acid monohydrate is introduced into a chamber in which a silicon substrate having evaporated Ni thereon (a silicon substrate having evaporated Ni on the naturally formed oxide film on the surface may be used) has been placed, and the interior of the chamber is heated to 700° C. at 700 Pa to decompose the benzene sulfonic acid monohydrate and to grow carbon nanotubes on the substrate using Ni as a catalyst. The carbon impurities which deposit during this process are removed by SO$_3$H of the benzene sulfonic acid, and clean carbon nanotubes are obtained.

INDUSTRIAL APPLICABILITY

In accordance with the present invention, carbon nanotubes can be grown on a substrate, using a CVD method, without giving rise to residual carbon impurities. With this method, utilization of carbon nanotubes in the field of semiconductor devices, or the like, that is sensitive to the presence of impurities can be significantly promoted.

The invention claimed is:

1. A method of manufacturing carbon nanotubes, in which carbon nanotubes are grown on a substrate by a chemical vapor deposition process using a reaction gas comprising a compound for the carbon source, wherein a compound having a carbon skeleton and a functional group which is effective for removing carbon impurities that deposit during the growth of carbon nanotubes, is used as the compound for the carbon source, the compound for the carbon source being an aliphatic hydrocarbon, and the aliphatic hydrocarbon having an NO$_2$, NO$_3$, SO$_3$, SO$_4$, NH$_2$, NH$_3$ or NH$_4$ group, as said functional group.

2. A method of manufacturing carbon nanotubes according to claim 1, wherein said hydrocarbon is methane, acetylene, ethane, propane or butane.

3. A method of manufacturing carbon nanotubes according to claim 1, wherein said compound for the carbon source contains, in its molecule, a transition metal as a catalyst for growing carbon nanotubes.

4. A method of manufacturing carbon nanotubes according to claim 3, wherein said transition metal is Fe, Co, Ni, or Pd.

5. A method of manufacturing carbon nanotubes according to claim 1, wherein a mixture of two or more compounds for the carbon source having said functional group is used.

* * * * *